Aug. 28, 1956

C. J. WESTLING 2,760,519

VALVE STRUCTURE

Filed Oct. 28, 1952

INVENTOR
CARL J. WESTLING

Aug. 28, 1956    C. J. WESTLING    2,760,519
VALVE STRUCTURE

Filed Oct. 28, 1952    2 Sheets-Sheet 2

INVENTOR
CARL J. WESTLING

United States Patent Office 2,760,519
Patented Aug. 28, 1956

2,760,519

VALVE STRUCTURE

Carl J. Westling, Pittsburgh, Pa., assignor to Vulcan Research Corporation, Pittsburgh, Pa., a corporation of Pennsylvania Application October 28, 1952, Serial No. 317,270

4 Claims. (Cl. 138—94.3)

This invention relates to valve structure and particularly to a valve structure of the type employing a valve member adapted to be positioned transversely of a conduit and movable between an open position in which flow of fluid through the conduit is permitted and a closed position in which flow of fluid through the conduit is inhibited together with a generally tubular seat member for connection with the portion of the conduit at one face of the valve member, a seat member carrier adapted for movement generally toward and away from the valve member to selectively dispose the seat member in seated and unseated relationship to the valve member and connections between the seat member carrier and the seat member. Such valves include goggle valves and plate valves. For purposes of explanation and illustration the invention will be described as embodied in a goggle valve.

Valves of the type with which the invention is concerned may be of large size and massive structure. Also, the valves may be subjected to high temperatures in use. For example, such valves are commonly used in large diameter gas lines in blast furnace and steel plants. The valves may be used in pipe line systems of relatively great length having inadequate or no provision for expansion and contraction due to variations in temperature within the system or due to the effect of exposure to sunshine or differential expansion of connected apparatus and piping, etc. Such valves may be several feet in diameter and may weigh several thousand pounds.

In most valves of the type above referred to the valve member in effect moves between ends of the pipe, the valve seat members acting as the pipe ends, while the clamping mechanism bridges the gap between the seat frames.

In all valves of the type in question the portions of the valve structure which bridge the gap or space between seats must be so disposed as to provide clearance for the transverse movement of the valve member whether that movement is of a swinging or reciprocating nature; also the valve member is commonly not contained within a housing such as would be fully equal in strength and rigidity to the pipe and thus able under all circumstances to transmit any possible pipe line stress without effect on the tightness of seat engagement within the valve structure.

The reason for the open structure of goggle valves is, of course, the nature of the service for which they are intended which is to "blank off" the pipe so that any leakage at the seats will be to the atmosphere and not past the valve member to the other side of the line where it could constitute a deadly hazard to men engaged in work on connected apparatus.

In most valves of the type under discussion some provision is made for adjustment in the clamping mechanism to compensate for possible uneven seat pressure upon the valve member. The limitations of such arrangements have in most cases been that the clamping elements due to the principle involved must be spaced too far apart circumferentially to permit proper equalization of seat pressure. In some valves on the other hand seat pressure was applied by a multiplicity of individually adjustable spring loaded cam, eccentric or toggle actuated clamp units all connected circumferentially to act in unison. In the latter the unclamping action is unsatisfactory and the clamping pressure is generally too low to insure tight seating while adjustment is tedious and may become impossible after the mechanism has been exposed to the elements and dirt for some period of time without attention.

Under the circumstances above outlined difficulties can be encountered in goggle type valves of large size in maintaining a tight and uniform seat engagement on both sides and around the circumference of the valve member. A valve which might initially be perfectly tight could due to excessive line expansion or contraction due to temperature develop unequal seat pressure distribution and consequent leakage which if allowed to continue would cut the seats beyond possibility of repair except by removal from the main at the end of a long period of operation. In the meantime a dangerous operating condition would be present. This hazard is greatest with hot dirty blast furnace gas.

I provide a rugged and simple adjustable valve structure in which seat pressure distribution can be equalized if desired without disturbing the clamping mechanism either before or after the valve is installed or in service.

I further provide an accessible valve structure in which by simple means such as an open end wrench the seat adjustment means is easily actuated after the valve is installed if necessary, but which may be locked or sealed at the factory to prevent unauthorized tampering.

I also provide an economical means of assembling valve seat frames and cooperating clamp or pressure frames which eliminates the necessity and expense of accurate machining of both with respect to the engagement between them but which at the same time permits accurate assembly and uniform pressure distribution adjustment.

I further provide a method of connecting the pressure frame to the seat frame which imposes the least possible twisting action or moment on the seat frame.

I still further provide a method of connecting the pressure frame to the seat frame which will distribute pressure through the greatest possible number of pressure points consistent with preventing the deflection in any part of the pressure frame from being transmitted to the seat frame.

I provide for distributing the pressure to the seat frames over a sufficient number of points to insure more than ample ring beam strength in the seat frame circumferentially between points thereby substantially to eliminate all deflection in the seat frame due to clamping pressure pressure application so that machined metal to metal seats can be maintained uniformly tight when clamped.

I also provide an adjustable clamp and seat frame combination in which either or both seat frames may be removed from or replaced in the valve assembly without dismantling the clamping frames, clamp mechanism or valve member and valve member mechanism.

I have solved the problem by an arrangement of parts hereinafter described which insures an adequate uniform seal between the seat member and the valve member. My valve structure is strong and rugged and capable of receiving and maintaining a desired adjustment despite difficult conditions of use.

Other details, objects and advantages of the invention will become apparent as the following description of a present preferred embodiment thereof proceeds.

In the accompanying drawings I have shown a present preferred embodiment of the invention in which Figure 1 is a face view of a valve structure;

Figure 3 is a fragmentary longitudinal cross-sectional view to enlarged scale of the valve structure shown in Figures 1 and 2 and taken on the line III—III of each of Figures 1 and 4.

Referring now more particularly to the drawings, the valve structure comprises a valve member or valve element proper in the form of a plate 2 shown as a goggle plate having an imperforate portion 3 adapted to be aligned with the conduit with which the valve is used when flow of fluid through the conduit is to be prevented or inhibited and a perforate portion 4 adapted to be aligned with the conduit when flow of fluid through the conduit is to be permitted.

Figure 2:
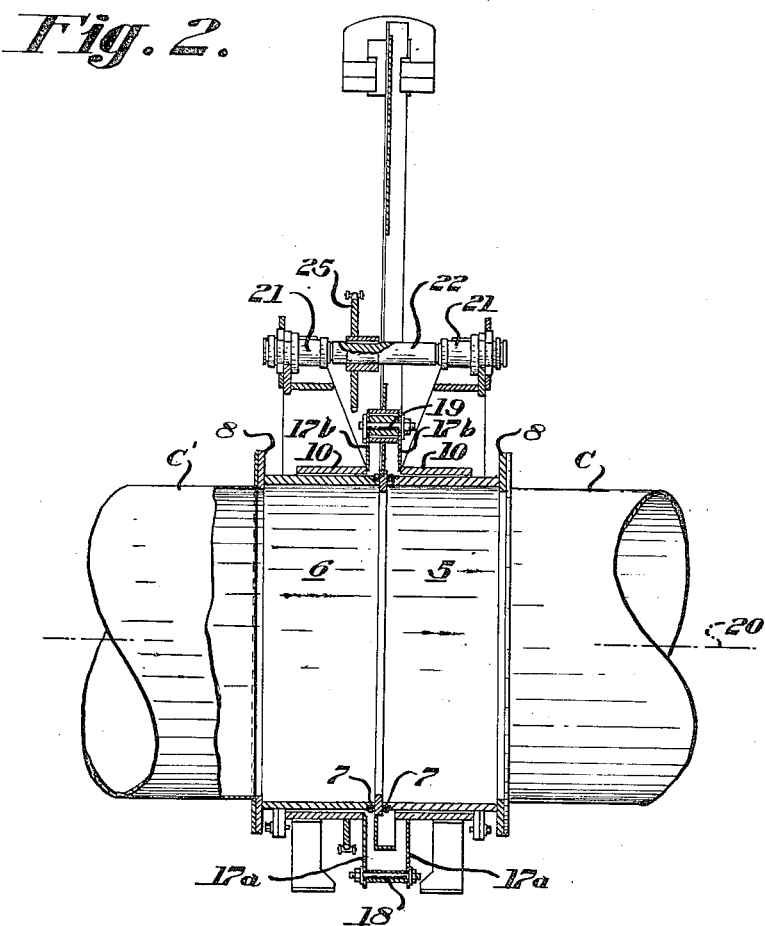
Figure 2 is a vertical longitudinal cross-sectional view through the valve structure shown in Figure 1 taken on the line II—II of that figure.

The valve comprises opposed seat members 5 and 6. The seat members 5 and 6 are identical. Each of them is of generally annular or drum shape having a sealing face 7 disposed toward the valve plate and a flange 8 disposed away from the valve plate. Each of the seat members 5 and 6 is adapted to be applied to a conduit generally coaxially thereof by having its flange 8 disposed in face-to-face relation with a flange of the conduit and suitably sealed and fastened thereto. Figure 2 shows diagrammatically conduit elements C and C' to which the respective seat members 5 and 6 are sealed and fastened. The seat members may be fastened to the conduit elements by bolts or other fastening means passing through appropriate bolt holes provided in the flanges thereof. The fastening means are not shown in the drawings, being conventional and known to those skilled in the art.

Figure 1:
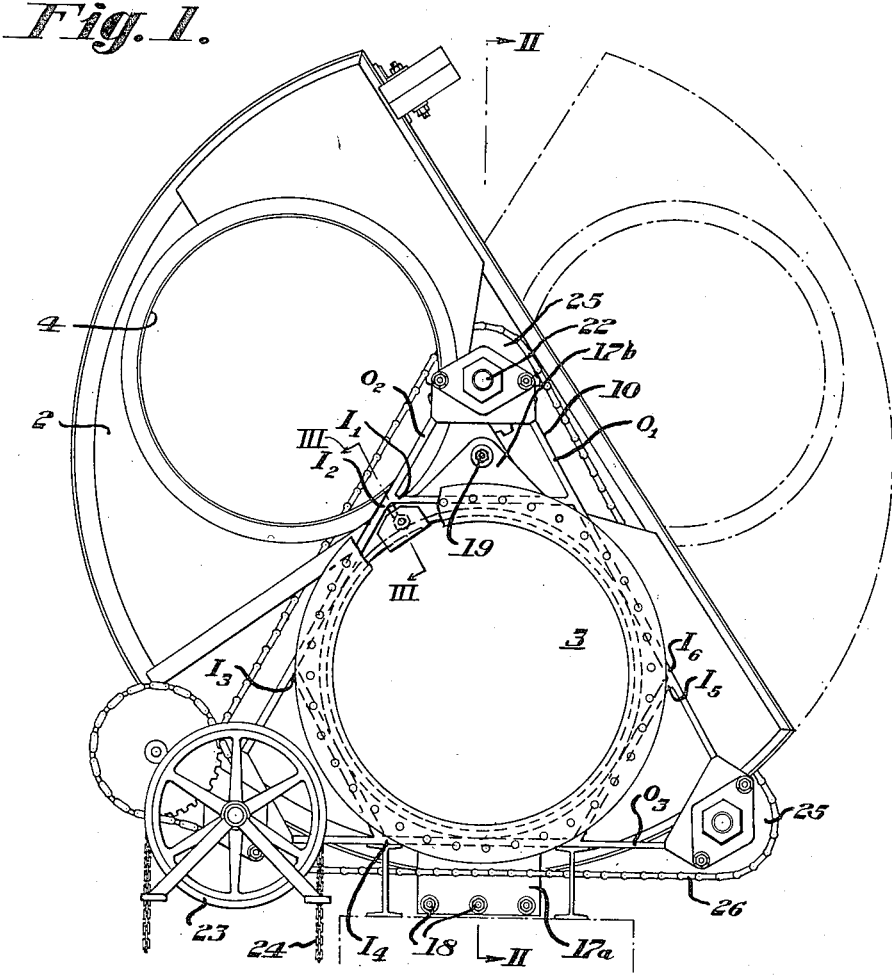

A seat member carrier designated generally by reference numeral 10 is provided for each of the seat members 5 and 6. Each of the seat member carriers 10 is in the form of a hollow frame generally triangular on the outside and generally hexagonal on the inside. The outside members of one of the seat member carriers 10 are designated $O_1$, $O_2$ and $O_3$, respectively, in Figure 1. The inside members of the seat member carrier shown in Figure 1 are designated $I_1$, $I_2$, $I_3$, $I_4$, $I_5$ and $I_6$, respectively. As will be seen from Figure 1, inside member $I_2$ is a part of outside member $O_2$, inside member $I_4$ is a part of outside member $O_3$ and inside member $I_6$ is a part of outside member $O_1$ while inside member $I_1$ is a strut extending between outside members $O_1$ and $O_2$, inside member $I_3$ is a strut extending between outside members $O_2$ and $O_3$ and inside member $I_5$ is a strut extending between outside members $O_1$ and $O_3$. The six inside members $I_1$, $I_2$, $I_3$, $I_4$, $I_5$ and $I_6$ form an equilateral hexagon which receives the corresponding seat member.

Figure 4:
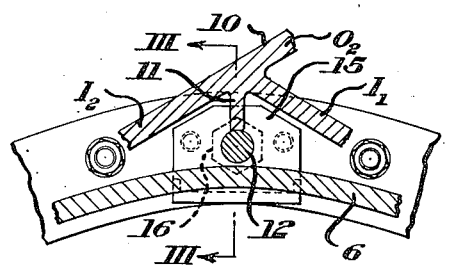
Figure 4 is a fragmentary transverse cross-sectional view taken on the line IV—IV of Figure 3.

Each of the seat members is connected with the corresponding seat member carrier by six adjustable connections as shown in Figures 3 and 4. Each of Figures 3 and 4 is a typical section through one of the adjustable connections, Figure 4 having reference characters applied thereto to designate specifically the connection between the seat member carrier at the juncture of the inner members $I_1$ and $I_2$ and the seat member 6 within that carrier. Extending inwardly from the juncture of the inner members $I_1$ and $I_2$ is a bracket plate 11 to the inner end of which is connected, as, for example, by welding, a rod 12. Each rod 12 extends beyond the bracket plate 11 which carries it in the direction away from the valve element 2 and has its outer end threaded as shown at 13. Each rod 12 passes through bores 14 in bracket members 15 carried by the seat member. A nut 16 is threaded onto the threaded outer end of each rod 12 and lies between the bracket members 15, the axial dimension of the nut being approximately the same as the distance between the opposed faces of the bracket members 15 so that the nut has no substantial axial movement relatively to the bracket members. Thus each of the seat members is carried by the corresponding seat member carrier by six adjustable connections equally spaced about the seat member and equidistant from its axis. Each of the adjustable connections is disposed radially inwardly from one of the six apices of the inner hexagon of the seat member carrier. By appropriate adjustment of the nuts 16 of the adjustable connections the seat member may be made to conform to the valve element 2 even though the latter is warped or for some other reason non-planar.

Each of the seat member carriers 10 has a downward projection 17a and an upward projection 17b. Three guide bolts 18 pass through the projections 17a and a guide bolt 19 passes through the projections 17b. The guide bolts 18 and 19 extend parallel to the axis of the conduit, which axis is indicated at 20 and is, of course, also the axis of the seat members 5 and 6. Thus the seat member carriers 10 are guided by the guide bolts 18 and 19 for relative movement generally axially of the conduit.

At each of the three apices of each of the triangular seat member carriers 10 is non-rotatably mounted a nut 21 of a differential screw mechanism for relatively moving the seat member carriers 10 generally axially of the conduit. At each apex there is a shaft 22 having at its ends in threaded engagement with the nuts 21 screw threads of the same hand but different lead. The differential screw mechanisms are of generally the construction shown in my Patent No. 2,606,454. As each shaft 22 turns the nuts 21 at the respective ends thereof, which, as above stated, are non-rotatably mounted in the seat member carrier, are caused to move slightly toward or away from each other since the threads are of different lead. Movement of the nuts toward or away from each other causes movement of the seat member carriers 10 toward or away from each other. To insure synchronous operation of the three differential screw mechanisms a sprocket 25 is fastened to each of the three shafts 22 and a sprocket chain 26 extends about the seat member carrier and meshes with the three sprockets. Thus when the sprocket chain moves in one direction the seat member carriers move toward each other and when the sprocket chain moves in the opposite direction the seat member carriers move away from each other. A chain wheel 23 is disposed about one of the shafts 22 and is either directly connected or geared to the shaft and has a pull chain 24 meshing therewith. Operation of the pull chain 24 moves the seat member carriers and hence the seat members carried thereby toward or away from each other depending upon the direction of movement of the chain 24.

Means are provided for moving the valve element 2 between the two positions thereof described above but such means are conventional and do not constitute the present invention and hence are not shown or described in detail. When the valve element 2 is to be moved between open and closed positions the seat members 5 and 6 are separated so that the valve element will move therebetween without binding. When the valve element 2 is in the position desired the seat members are moved into contact with the valve element at the opposite faces thereof to seal thereagainst. By appropriate adjustment of the nuts 16 adequate sealing of the respective seat members to the valve element is obtained despite irregularities in the valve element or the seat members or both the valve element and the seat members.

While I have shown and described a present preferred embodiment of the invention it is to be distinctly understood that the invention is not limited thereto but may be otherwise variously embodied within the scope of the following claims.

I claim:

1. In a valve structure comprising a valve member adapted to be positioned transversely of a conduit and movable between an open position in which flow of fluid through the conduit is permitted and a closed position in which flow of fluid through the conduit is inhibited, a generally tubular seat member adapted for connection with the portion of the conduit at one face of the valve member, a seat member carrier adapted for movement generally toward and away from the valve member to selectively dispose the seat member in seated and unseated relationship to the valve member and connections between the seat member carrier and the seat member, the connections comprising separate individually adjustable means spaced apart generally circumferentially of the seat member fastening the seat member to the seat member carrier for relative adjustment to the seat member and the seat member carrier in a direction generally parallel to the axis of the seat member.

2. In a valve structure comprising a valve member adapted to be positioned transversely of a conduit and movable between an open position in which flow of fluid through the conduit is permitted and a closed position in which flow of fluid through the conduit is inhibited, a generally tubular seat member adapted for connection with the portion of the conduit at one face of the valve member, a seat member carrier adapted for movement generally toward and away from the valve member to selectively dispose the seat member in seated and unseated relationship to the valve member and connections between the seat member carrier and the seat member, the connections comprising a plurality of bolts spaced apart circumferentially of the seat member each connected with one of the seat member and the seat member carrier and extending in a direction generally parallel to the axis of the seat member, a nut threadedly engaging each bolt and means on the other of the seat member and the seat member carrier embracing each nut at the end faces thereof to permit turning thereof while inhibiting axial movement thereof whereby circumferentially spaced portions of the seat member are adjustable relatively to the seat member carrier in a direction generally parallel to the axis of the seat member to insure substantially uniform engagement between the seat member and the valve member circumferentially of the seat member when the seat member is in seated relationship to the valve member.

3. In a valve structure comprising a valve member adapted to be positioned transversely of a conduit and movable between an open position in which flow of fluid through the conduit is permitted and a closed position in which flow of fluid through the conduit is inhibited, a generally tubular seat member adapted for connection with the portion of the conduit at one face of the valve member, a generally polygonal hollow seat member carrier disposed about a portion of the seat member, means cooperating with the seat member carrier adjacent the apices thereof for moving the seat member carrier generally toward and away from the valve member to selectively dispose the seat member in seated and unseated relationship to the valve member and connections between the seat member carrier and the seat member, the connection comprising adjustable means disposed at intervals about the seat member fastening the seat member interiorly of the seat member carrier for relative adjustment of the seat member and the seat member carrier in a direction generally parallel to the axis of the seat member.

4. In a valve structure comprising a valve member adapted to be positioned transversely of a conduit and movable between an open position in which flow of fluid through the conduit is permitted and a closed position in which flow of fluid through the conduit is inhibited, a generally tubular seat member adapted for connection with the portion of the conduit at one face of the valve member, a hollow seat member carrier disposed about a portion of the seat member adapted for movement generally toward and away from the valve member to selectively dispose the seat member in seated and unseated relationship to the valve member and connections between the seat member carrier and the seat member, the seat member carrier being generally equilaterally triangular exteriorly and equilaterally and equiangularly hexagonal interiorly, means cooperating with the seat member carrier adjacent the three exterior apices thereof for moving the seat member carrier generally toward and away from the valve member, the connections between the seat member carrier and the seat member comprising six elongated connecting elements spaced apart substantially equidistantly circumferentially of the seat member each connected with one of the seat member and the seat member carrier and extending in a direction generally parallel to the axis of the seat member and an element cooperating with each of such six elongated connecting elements for adjustment relatively thereto generally lengthwise thereof and connected with the other of the seat member and the seat member carrier, the elements connected with the seat member carrier being connected therewith at the interior apices thereof, whereby circumferentially spaced portions of the seat member are adjustable relatively to the seat member carrier in a direction generally parallel to the axis of the seat member to insure substantially uniform engagement between the seat member and the valve member circumferentially of the seat member when the seat member is in seated relationship to the valve member.

References Cited in the file of this patent

UNITED STATES PATENTS

| | | |
|---|---|---|
| 1,506,021 | McGee | Aug. 26, 1924 |
| 1,842,056 | Westling | Jan. 19, 1932 |
| 1,967,695 | Westing | July 24, 1934 |
| 1,998,081 | Gerlich | Apr. 16, 1935 |
| 2,229,124 | Boynton et al. | Oct. 20, 1942 |
| 2,600,497 | Hamer | June 17, 1952 |
| 2,615,473 | Hamer | Oct. 28, 1952 |